United States Patent Office 3,073,691
Patented Jan. 15, 1963

3,073,691
METHOD OF KILLING MICROORGANISMS, PLANT PESTS, AND PLANTS WITH HALOGENATED THIOPHENE-1,1-DIOXIDE COMPOUNDS
Henry Bluestone, University Heights, Ohio, assignor to Diamond Alkali Company, Cleveland, Ohio, a corporation of Delaware
No Drawing. Filed Feb. 23, 1960, Ser. No. 10,035
22 Claims. (Cl. 71—2.5)

This invention relates to a new and improved method of controlling insects, fungi, microorganisms and undesirable plant growth using compounds represented by the structure $$\begin{array}{c} X_2-C\!\!=\!\!\!=\!\!\!=\!\!C-X_3 \\ X_1-C\!\!=\!\!\!=\!\!\!=\!\!C-X_4 \\ \diagdown S \diagup \\ O \;\; O \end{array}$$

wherein $X_1$, $X_2$, $X_3$, and $X_4$ are selected from the group consisting of hydrogen and halogen atoms, e.g., fluorine, chlorine, bromine, or iodine, chlorine being preferred, at least one X being halogen.

This is a continuation-in-part of Serial No. 709,449, filed January 17, 1958, now U.S. Patent No. 2,976,297.

More specifically, the presently preferred compounds used in practice of this invention may be represented by the structure $$\begin{array}{c} X-C\!\!=\!\!\!=\!\!\!=\!\!C-X \\ H-C\!\!=\!\!\!=\!\!\!=\!\!C-H \\ \diagdown S \diagup \\ O \;\; O \end{array}$$

wherein X is a halogen atom, chlorine being preferred, and at least one X being halogen.

Specific and illustrative compounds falling within the scope of this invention are:
3,4-dichlorothiophene 1,1-dioxide
3-chlorothiophene 1,1-dioxide
3,4-dibromothiophene 1,1-dioxide
3-bromothiophene 1,1-dioxide
2,3-dichlorothiophene 1,1-dioxide
2,5-dichlorothiophene 1,1-dioxide
2,4-dichlorothiophene 1,1-dioxide
3,4-difluorothiophene 1,1-dioxide
2,3,4,5-tetrachlorothiophene 1,1-dioxide
2,3,4-tribromothiophene 1,1-dioxide
2,3,4-trichlorothiophene 1,1-dioxide
2,5-dibromothiophene 1,1-dioxide Broadly, compounds of this invention may be prepared by dehydrohalogenating a compound of the structure $$\begin{array}{c} X_5 \;\;\;\; X_6 \\ X_2-C\!-\!\!-\!\!-\!C-X_3 \\ X_1-C\;\;\;\;\;\;\;C-X_4 \\ H \diagup S \diagdown H \\ O \;\; O \end{array}$$

with an alkaline reagent, wherein $X_1$, $X_2$, $X_3$, $X_4$, $X_5$ and $X_6$ are selected from the group consisting of hydrogen and halogen, at least $X_5$, $X_6$ and one other X being halogen, whereby two moles of HX are eliminated.

Alternatively, compounds of this invention may be prepared by dehydrohalogenating a compound of the structure $$\begin{array}{c} X_5 \\ X_2-C\!-\!\!-\!\!-\!C\!=\!X_3 \\ X_1-C\;\;\;\;\;\;\;C-X_4 \\ H \diagup S \diagdown H \\ O \;\; O \end{array}$$

wherein $X_1$, $X_2$, $X_3$, $X_4$, and $X_5$ are selected from the group consisting of hydrogen and halogen, at least $X_5$ and one other X being halogen, whereby one mole of HX is eliminated, with an alkaline reagent.

More specifically, compounds of this invention may be prepared by chemically reacting a compound of the structure $$\begin{array}{c} X \;\;\;\; X \\ X-C\!-\!\!-\!\!-\!C-X \\ H_2-C\;\;\;\;\;\;\;C-H_2 \\ \diagdown S \diagup \\ O \;\; O \end{array}$$

with an alkaline reagent, e.g., an alkali metal hydroxide such as sodium hydroxide or potassium hydroxide, ammonia, ammonium hydroxide or an alkali metal carbonate such as sodium carbonate, potassium carbonate, sodium bicarbonate or an amine such as diethylamine, ethanolamine, or pyridine, where X is a halogen atom, e.g., fluorine, chlorine, bromine, or iodine, chlorine being preferred.

Typically, the above reactions may be carried out in the presence of a solvent, e.g., an organic solvent such as methanol, ethanol, acetone, cyclohexanone, xylene, or water. The reactions are also carried out at a temperature high enough to cause chemical reaction, e.g., from 0° C. up to the decomposition temperature of the starting materials, although desirably at a temperature below 115° C., preferably within the range from 20° to 35° C.

Exemplary of the above preparations, a halothiophene 1,1-dioxide may be prepared by chemically reacting a polyhaloteterahydrothiophene 1,1-dioxide, such as 3,3,4,4-tetrachlorotetrahydrothiophene 1,1-dioxide, 2,3,4,4-tetrachlorotetrahydrothiophene 1,1-dioxide, 2,3,3,4 - tetrachlorotetrahydrothiophene 1,1-dioxide, 3,4-dichloro-3,4-difluorotetrahydrothiophene 1,1-dioxide, 2,3,4-tribromotetrahydrothiophene 1,1-dioxide, 2,3,3,4,4-pentachlorotetrahydrothiophene 1,1-dioxide, 3,4-dibromo - 3,4 - dichlorotetrahydrothiophene 1,1-dioxide, 3,3,4-trichloro-4-fluorotetrahydrothiophene 1,1-dioxide or a polyhalodihydrothiophene 1,1-dioxide, such as 2,3,4,4-tetrahalodihydrothiophene 1,1-dioxide, 3,3,4,5-tetrahalodihydrothiophene 1,1-dioxide, 3,3,4-trihalodihydrothiophene 1,1-dioxide, 2,3,4-trihalodihydrothiophene 1,1-dioxide, i.e., 3,3,4,5-tetrachlorodihydrothiophene 1,1-dioxide, 2,3,4,4-tetrachlorodihydrothiophene 1,1-dioxide, 2,3,4-tribromodihydrothiophene 1,1-dioxide, 3,4-dichloro-4-fluorodihydrothiophene 1,1-dioxide, 3,3,4-tribromodihydrothiophene 1,1-dioxide with an alkaline reagent, as previously defined; also a solvent may be used to advantage, e.g., an organic solvent such as methanol, ethanol, propanol, acetone, cyclohexanone, xylene, or water. The reaction is carried out at a temperature high enough to cause chemical reaction, e.g., from 0° C. up to the decomposition temperature of the starting materials, although desirably below 115° C., preferably within the range from 20° to 35° C.

Recovery of the product may be carried out by adding a miscible solvent in which the product is relatively insoluble, to the reaction mixture until the product precipitates, or the original solvent may be removed through distillation, preferably at reduced pressure.

The novel compounds of this invention are useful as chemical intermediates and exhibit a high degree of chemical reactivity; also these novel compounds possess marked biological activity. More specifically, these compounds are active pesticides, e.g., insecticides, as for the control of aphids; fungicides, as for the control of soil fungi; herbicides, as in the control of undesirable plant growth; and for the control of microorganism growth e.g., bactericides.

These compounds may be used along or in combination with other known biologically active materials, such as other polyhydrothiophene 1,1-dioxides, organic phosphate pesticides, chlorinated hydrocarbon insecticides, foliage and soil fungicides, pre- and post-emergent herbicides, and the like.

While compounds of this invention may be employed in a variety of applications, biologically active or otherwise, when employed as biologically active materials, it will be understood, of course, that such compounds may be utilized in diverse formulations, both liquid and solid, including finely-divided powders and granular materials as well as liquids such as solutions, concentrates, emulsifiable concentrates, slurries and the like, depending upon the application intended and the formulation media desired.

Thus, it will be appreciated that compounds of this invention may be employed to form biologically active substances containing such compounds as essential active ingredients thereof, which compositions may also contain carriers, including finely-divided dry or liquid diluents, extenders, fillers, conditioners, including various clays, diatomaceous earth, talc, spent catalyst, alumina-silica material, solvents, diluents, etc., including water and various organic liquids, such as benzene, toluene, chlorinated benzene, acetone, cyclohexanone, xylene, carbon disulfide and various mixtures thereof.

When liquid formulations are employed or dry materials prepared which are to be used in liquid form, it is desirable in certain instances additionally to employ a wetting, emulsifying or dispersing agent to facilitate use of the formulation, e.g., anionic and cationic surface active agents, cationic quarternary ammonium salt, alkyl aryl sulfonate surface active agents, non-ionic polyoxyalkylene fatty ester surface active agents, Triton X-155 (alkyl aryl polyether alcohol, U.S. Patent No. 2,504,064). A detailed list of such agents is set forth in an article by John W. McCutcheon in Soap and Chemical Specialties, vol. 31, No. 7-10, 1955. In general, less than 10% by weight of the surface active agents is present in the compositions of the invention and usually less than 1% by weight is present.

The term "carrier" employed in the specification and claims is intended to refer broadly to materials constituting a major proportion of a biologically active or other formulation and hence includes finely-divided materials, both liquid and solid as aforementioned conveniently used in such application.

In order that those skilled in the art may more completely understand the present invention and the preferred methods by which the same may be carried into effect, the following specific examples are offered.

EXAMPLE I

*Preparation of 3,4-Dichlorothiophene 1,1-Dioxide*

258 g. (1.0 mol) of 3,3,4,4-tetrachloro tetrahydrothiophene 1,1-dioxide is dissolved in 2 liters of methanol at room temperature. Aqueous ammonia (28%) (approximately 150 g.) is added portionwise to the methanol solution with stirring until the solution remains basic. The solution is cooled during the addition to maintain a temperature of 30° to 35° C. The solution is allowed to stand to insure complete reaction enough aqueous ammonia being added to maintain a basic solution.

One liter of distilled water is then added to the methanol solution and the methanol is distilled off at 20-25 mm. Hg pressure employing a water bath at about 40° C. The precipitated product is filtered off and washed with distilled water. After recrystallization, the product is dried in an evacuated desiccator yielding the desired $C_4H_2Cl_2O_2S$, which melts with decomposition at 112° to 113° C. Preparation of the desired product is indicated by the following elemental analyses:

| Element | Actual percent by weight | Calculated percent by weight |
| --- | --- | --- |
| C | 25.91 | 25.96 |
| Cl | 38.0 | 38.32 |

This 3,4-dichlorothiophene 1,1-dioxide is greater than 5% soluble in acetone, cyclohexanone and xylene but less than 5% soluble in water.

EXAMPLE II

In order to demonstrate insecticidal activity, male German cockroaches, *Blattella germanica*, 8 to 9 weeks old are anesthetized with carbon dioxide to facilitate handling and then dipped in a test formulation (2000 p.p.m. product of Example I, 5% acetone, 0.01% Triton X-155, balance water) for ten seconds, removed, and freed of excess liquid and caged. The two lots of ten insects each are exposed to this formulation and mortality observations are reported after three days. Using the product of Example I at the above concentration, 100% mortality is observed.

EXAMPLE III 25 houseflies, 4 to 5 days old, are caged over small paper cups containing a piece of cellu-cotton impregnated with 15 ml. of test formulation and 10% concentration of sugar. The test formulations comprise 2000 p.p.m. and 1000 p.p.m. of the product of Example I, 5% acetone, 0.01% Triton X-155, balance water. Mortality counts taken 24 hours after application show greater than 80% and greater than 60% mortality, respectively, at the above concentrations.

EXAMPLE IV

Further insecticidal utility is shown using the bean aphid, *Aphis fabae*, cultured on Nasturtium plants. No attempt is made to select insects of a given age in this test. Nasturtium plants are infested with approximately 100 aphids and are treated by pouring a formulation (2000 p.p.m. product of Example I, 5% acetone, 0.01% Triton X-155, balance water) on the soil at a rate equivalent to 64 lbs./acre. Aphid mortality of 100% is observed 24 hours after treatment for the 3,4-dichlorothiophene 1,1-dioxide.

EXAMPLE V

Spore germination tests on glass slides are conducted via the test tube dilution method adopted from the procedure recommended by the American Phytopathological Society's Committee on standardization of fungicidal tests. In this procedure, the product of Example I, in aqueous formulations at concentrations of 1000, 100, 10 and 1.0 parts per million, is tested for its ability to inhibit germination of spores from 7 to 10 day old cultures of *Alternaria oleracea* and *Monilinia fructicola*. These concentrations refer to initial concentrations before diluting 4 volumes with 1 volume of spore stimulant and spore suspension. Germination records are taken after 20 hours of incubation at 22° C. by counting 100 spores.

Results indicate that concentrations of less than 1.0 p.p.m. afford disease control for both of the *A. oleracea* and *M. fructicola*.

EXAMPLE VI

Further fungicidal activity is demonstrated by the ability of 3,4-dichlorothiophene 1,1-dioxide to protect pea seed and seedlings from seed decay and damping off fungi (Pythium and Fusarium). In this test, infested soil in 4" x 4" x 3" plant band boxes is treated by soil drench methods at rates equivalent to 16, 8 and 4 lbs./acre. Treatment is accomplished by pouring 70 ml. of the test formulation (concentration product of Example I, 5% acetone, 0.01% Triton X-155, balance water) on the surface of the soil. This is allowed to stand until the next day when the soil is removed from each box and thoroughly mixed before being replaced in the box. Three days after such treatment, 25 pea seeds, variety Perfection, are planted to a uniform depth in each box. Percentage stands recorded 14 days after planting show 94%, 96% and 100% stands, respectively, at the above concentrations whereas the untreated soil control shows only a 3% stand, thus indicating high soil fungicidal activity.

EXAMPLE VII

Pre-emergent herbicidal activity is indicated using seeds of perennial rye grass and radish which are treated in petri dishes with aqueous suspensions of the product of Example I at concentrations of 1000 and 100 p.p.m. (i.e., 1000 and 100 p.p.m. 3,4-dichlorothiophene 1,1-dioxide, 5% acetone, 0.01% Triton X-155, balance water). Lots of 25 seeds of each type are scattered in separate dishes containing filter paper discs moistened with 5 ml. of the test formulation at each concentration. After 7 to 10 days, the concentration of the test compound that inhibits germination of half of the seeds (E.D. 50 values) the test crop is determined. Accordingly, 3,4-dichlorothiophene 1,1-dioxide has an E.D. 50 value between 10 and 100 p.p.m. for both radish and rye grass seeds.

EXAMPLE VIII

Further to evaluate the effects of the product of Example 1 upon the germination of seeds in soil, a mixture of seeds of six crop plants is broadcast in 8" x 8" x 2" metal cake pans filled to within ½" of the top with composted greenhouse soil. The seed is uniformly covered with about ¼" of soil and watered. Twenty-four hours after such treatment, 80 ml. of an aqueous test formulation containing 320 mg. of the product of Example I is sprayed at 10 lbs. air pressure uniformly over the surface of the pan. This treatment is equivalent to 64 lbs./acre. Additional evaluations are carried out at concentrations of 8 lbs./acre and 4 lbs./acre. The seed mixture contains representatives of three broadleafs: turnip, flax, and alfalfa; and of three grasses: wheat, millet and rye grass. Two weeks after treatment, records are taken on seedling stand as compared to an untreated control. Using this procedure, the data on percentage stand are given in Table I.

TABLE I

| Application concentration in lbs./acre | Broadleaf seeds [1] | Grass seeds [1] |
| --- | --- | --- |
| 64 | [2] 1 | 20 |
| 8 | 50 | 90 |
| 4 | 60 | 100 |

[1] Results indicate percentage stand.
[2] Only the alfalfa seeds emerged and grew.

EXAMPLE IX

To test post emergence herbicidal activity, tomato plants, variety Bonny Best, 5 to 7 inches tall; corn, variety Cornell M-1 (field corn), 4 to 6 inches tall; bean, variety Tendergreen, just as the trifoliant leaves are beginning to unfold; and oats, variety Clinton, 3 to 5 inches tall, are sprayed with an aqueous test formulation (3200 p.p.m. product of Example I, 5% acetone, 0.01 Triton X-155, balance water) the plants are sprayed with 100 ml. at 40 lbs. air pressure while being rotated on a turn table in a spray hood. Records are taken 14 days after treatment and herbicidal activity is rated on a scale from 0 for no injury to 11 for plant kill. Using this procedure, 3,4-dichlorothiophene 1,1-dioxide receives ratings as shown in Table II hereinbelow:

TABLE II [1]

| Concentration [1] used in p.p.m. | Plants | | | |
| --- | --- | --- | --- | --- |
| | Tomato | Bean | Corn | Oats |
| 3,200 | 11 | 11 | 10 | 7 |
| 1,600 | 11 | 9 | 8 | 6 |

[1] See Example IX for explanation of procedure.

EXAMPLE X

To detect root absorption and translocation in growing plants, tomato plants, variety Bonny Best, 5 to 7 inches tall, and corn plants, variety Cornell M-1 (field corn), 4 to 6 inches tall are treated by pouring 51 ml. of a formulation consisting of 1000 p.p.m. test chemical, 5% acetone, 0.01% Triton X-155, balance water, on the soil of 4" pots in which the plants are growing. The test chemical is applied at the rate equivalent to 32 lbs./acre. Plants are held under control greenhouse conditions for 10 days before examination, at which time herbicidal effect is observed and ratings given based on a scale from 0 for no injury to 11 for plant kill. Using this procedure, the product of Example I receives a rating of 11 for the tomato and 8 for the bean plants.

EXAMPLE XI

To evaluate bactericidal activity, the product of Example I is mixed with distilled water containing 5% acetone and 0.01% Triton X-155 at a concentration of 256 p.p.m. Five ml. of the test formulation is put in each of four test tubes, to each of which is then added one of the organisms: *Erwenia amylovora, Xanthamonas phaseoli, Staphylococcus aureus,* and *Escherichia coli,* in the form of a saline solution of a bacterial suspension from potato dextrose agar plates. The tubes are then incubated for four hours at 30° C. after which transfers are made to sterile broth with a standard 4 ml. loop. The thus-inoculated broth is incubated for 48 hours at 37° C. at which time bacterial growth is rated on a percentage scale wherein 0=no growth. Using this procedure, the product of Example I receives ratings of 0, 0, 0, and 0 for each of the above organisms.

EXAMPLE XII

In order to make an in vitro evaluation of the product of Example I as a nematode contact poison, nonplant parasitic nematodes, *Panagrellus redivivus,* are exposed by contact to the test chemical in small watch glasses (27 mm. diameter by 8 mm. deep) and placed in a 9 centimeter Petri dish. Aqueous test formulations (1000 p.p.m. and 500 p.p.m. product of Example I, 5% acetone, 0.01% Triton X-155, balance water) are added to the nematodes. Results are recorded 24 hours after treatment and from these, mortality ratings of 100% and 100%, respectively, are indicated for the above concentrations.

EXAMPLE XIII

Outstanding ability of the 3,4-dichlorothiophene 1,1-dioxide as a fumigant nematode poison is demonstrated by exposing non-plant parasitic nematodes, *Panagrellus redivivus,* to the vapor of the test chemical in small watch glasses (27 mm. diameter by 8 mm. deep) in a 9 centimeter Petri dish. Test formulations containing two and one mg. of the product of Example I, with 5% acetone, 0.01% Triton X-155, balance water, are used in the small watch glasses but not in contact with the nematodes. Observations after 24 hours indicate 100% and 100% mortality, respectively, using 3,4-dichlorothiophene 1,1-dioxide at the above concentrations.

EXAMPLE XIV

*Preparation of 2,4-Dichlorothiophene 1,1-Dioxide*

5.16 g. (0.02 mol) of 2,3,4,4-tetrachlorotetrahydrothiophene 1,1-dioxide is dissolved in 20 ml. of methanol and the solution cooled in an ice bath. 2.85 g. of concentrated $NH_4OH$ (0.06 mol of $NH_3$ in water) is added portionwise. A precipitate of $NH_4Cl$ forms; however, upon addition of 250 ml. of water the $NH_4Cl$ precipitate dissolves and the desired product precipitates as an oil. The mixture is extracted and crystallized with chloroform, benzene, and petroleum ether yielding the desired $$C_4H_2Cl_2O_2S$$

EXAMPLE XV

*Preparation of 2,3,4-Trichlorothiophene 1,1-Dioxide*

5.1 g. (0.02 mol) of 2,3,4,4-tetrachloro-2,3-dihydrothiophene 1,1-dioxide is dissolved in 50 ml. of methanol. 2.0 ml. of 28% $NH_3$ in water is added and the solution allowed to stand for about 15 to 24 hours. Upon diluting with 500 ml. of water the desired product precipitates out as an oil. Upon extraction and recrystallization using chloroform, carbon tetrachloride, petroleum ether, benzene, and cyclohexone, the desired $C_4HCl_3O_2S$ is obtained having ultra violet spectrum peaks at 238 mμ and 312 mμ.

These compounds also demonstrate biological activity significantly different from activity of other substituted and unsubstituted tetrahydrothiophene 1,1-dioxide, and substituted and unsubstituted dihydrothiophene 1,1-dioxides, as well as other halogen-substituted pesticides. Exemplary of this is the table appearing on page 11 (Table I) comparing certain biological activity of 3,4-dichlorothiophene 1,1-dioxide; 3,4-dichloro-2,3-dihydrothiophene 1,1-dioxide; 3,4-dichlorotetrahydrothiophene 1,1-dioxide; 4-chloro-2,3-dihydrothiophene 1,1-dioxide; tetrahydrothiophene 1,1-dioxide; and 3,4-dihydrothiophene 1,1-dioxide.

TABLE III

*Biological Activity [1]*

| Compound structure | Compound name | Concentration which affords at least 50% disease control of the *A. oleracea* and *M. fructicola*. | |
|---|---|---|---|
| | | *A. oleracea*,[1] ppm. | *M. fructicola*, ppm. |
|  | 3,4-dichlorothiophene 1,1-dioxide. | 1 | 1 |
| Cl—C=C—Cl, HC—CH₂, with S, O, O | 3,4-dichloro-2,3-dihydrothiophene 1,1-dioxide. | 10–100 | 10–100 |
| Cl—C—C—Cl, H₂C—CH₂, with S, O, O | 3,4-dichlorotetrahydrothiophene 1,1-dioxide. | 1,000 | 1,000 |
| H—C=C—Cl, H—C—C—H, with S, O, O | 4-chloro-2,3-dihydrothiophene 1,1-dioxide. | 100–1,000 | 100–1,000 |
| H₂C—CH₂, H₂C—CH₂, with S, O, O | Tetrahydrothiophene 1,1-dioxide. | 1,000 | 1,000 |
| HC=CH, H₂C—CH₂, with S, O, O | 3,4-dihydrothiophene 1,1-dioxide. | 100–1,000 | 1,000 |

See footnote at end of table.

[1] For test procedure and conditions see Example V.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of killing microorganisms, plant pests, and plants which comprises contacting the locus where said killing is to be effected with a lethal amount of a compound having the structure

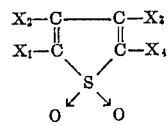

wherein $X_1$, $X_2$, $X_3$, and $X_4$ are selected from the group consisting of hydrogen and halogen atoms, at least one X being halogen.

2. The method of killing insects which comprises contacting said insects with an insecticidal amount of a compound having the structure

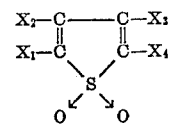

wherein $X_1$, $X_2$, $X_3$, and $X_4$ are selected from the group consisting of hydrogen and halogen atoms, at least one X being halogen.

3. The method of killing fungi which comprises contacting said fungi with a fungicial amount of a compound having the structure

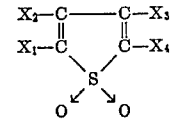

wherein $X_1$, $X_2$, $X_3$, and $X_4$ are selected from the group consisting of hydrogen and halogen atoms, at least one X being halogen.

4. The method of killing plants which comprises contacting said plants with a herbicidal amount of a compound having the structure.

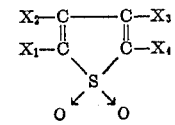

wherein $X_1$, $X_2$, $X_3$, and $X_4$ are selected from the group consisting of hydrogen and halogen atoms, at least one X being halogen.

5. The method of killing microorganisms which comprises contacting said microorganisms with a lethal amount of a compound having the structure

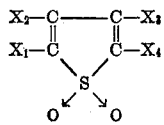

wherein $X_1$, $X_2$, $X_3$, and $X_4$ are selected from the group consisting of hydrogen and halogen atoms, at least one X being halogen.

6. A method of controlling insect growth which comprises contacting said insects with an insecticidal amount of 3,4-dichlorothiophene 1,1-dioxide.

7. A method of controlling fungus growth which comprises contacting said fungus with a fungicidal amount of 3,4-dichlorothiophene 1,1-dioxide.

8. A method of controlling undesirable plant growth which comprises contacting said plants with a herbicidal amount of 3,4-dichlorothiophene 1,1-dioxide.

9. A method of controlling microorganism growth which comprises contacting said microorganism with a lethal amount of 3,4-dichlorothiophene 1,1-dioxide.

10. A method of controlling nematode growth which comprises contacting said nematodes with a nematocidal amount of 3,4-dichlorothiophene 1,1-dioxide.

11. The method of killing microorganisms, plant pests, and plants which comprises contacting the locus where said killing is to be effected with a lethal amount of 3,4-dichlorothiophene 1,1-dioxide.

12. The method of killing microorganisms, plant pests, and plants which comprises contacting the locus where said killing is to be effected with a lethal amount of 3-chlorothiophene 1,1-dioxide.

13. The method of killing microorganisms, plant pests and plants which comprises contacting the locus where said killing is to be effected with a lethal amount of 3,4-dibromothiophene 1,1-dioxide.

14. The method of killing microorganisms, plant pests, and plants which comprises contacting the locus where said killing is to be effected with a lethal amount of 3-bromothiophene 1,1-dioxide.

15. The method of killing microorganisms, plant pests, and plants which comprises contacting the locus where said killing is to be effected with a lethal amount of 2,3-dichlorothiophene 1,1-dioxide.

16. The method of killing microorganisms, plant pests, and plants which comprises contacting the locus where said killing is to be effected with a lethal amount of 2,5-dichlorothiophene 1,1-dioxide.

17. The method of killing microorganisms, plant pests, and plants which comprises contacting the locus where said killing is to be effected with a lethal amount of 2,4-dichlorothiophene 1,1-dioxide.

18. The method of killing microorganisms, plant pests, and plants which comprises contacting the locus where said killing is to be effected with a lethal amount of 3,4-difluorothiophene 1,1-dioxide.

19. The method of killing microorganisms, plant pests, and plants which comprises contacting the locus where said killing is to be effected with a lethal amount of 2,3,4,5-tetrachlorothiophene 1,1-dioxide.

20. The method of killing microorganisms, plant pests, and plants which comprises contacting the locus where said killing is to be effected with a lethal amount of 2,3,4-tribromothiophene 1,1-dioxide.

21. The method of killing microorganisms, plant pests, and plants which comprises contacting the locus where said killing is to be effected with a lethal amount of 2,3,4-trichlorothiophene 1,1-dioxide.

22. The method of killing microorganisms, plant pests, and plants which comprises contacting the locus where said killing is to be effected with a lethal amount of 2,5-dibromothiophene 1,1-dioxide.

References Cited in the file of this patent

UNITED STATES PATENTS

| | | |
|---|---|---|
| 2,504,099 | Morris et al. | Apr. 18, 1950 |
| 2,928,766 | Rosen | Mar. 15, 1960 |
| 2,937,972 | Bluestone et al. | May 24, 1960 |
| 2,939,871 | Pyne et al. | June 7, 1960 |
| 2,957,887 | Berkey et al. | Oct. 25, 1960 |

FOREIGN PATENTS

| | | |
|---|---|---|
| 536,564 | Canada | Jan. 29, 1957 |
| 542,599 | Belgium | Nov. 30, 1955 |